Figures 1, 2:
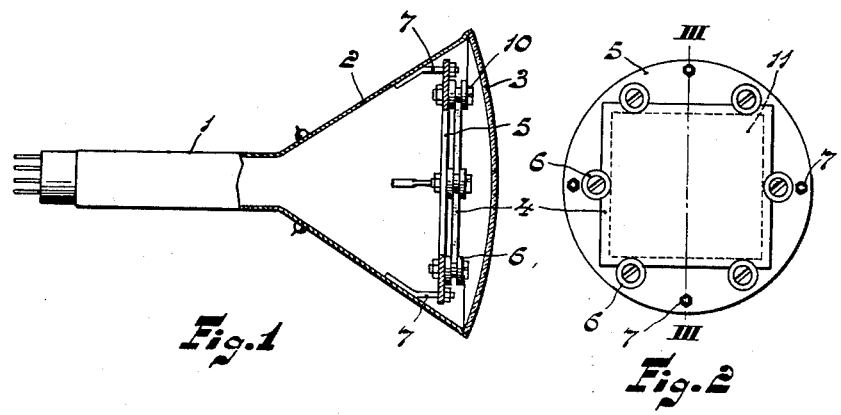

Feb. 12, 1957

P. VAN BREE ET AL 2,781,469

CATHODE-RAY TUBE, MORE PARTICULARLY
FOR COLOUR TELEVISION

Filed Oct. 20, 1953

INVENTORS
PIETER VAN BREE
THEODORUS HAGENBERG

BY

AGENT

United States Patent Office 2,781,469
Patented Feb. 12, 1957

2,781,469
CATHODE-RAY TUBE, MORE PARTICULARLY FOR COLOUR TELEVISION

Pieter van Bree and Theodorus Hagenberg, Eindhoven, Netherlands, assignors to Hartford National Bank and Trust Company, Hartford, Conn., as trustee Application October 20, 1953, Serial No. 387,195

Claims priority, application Netherlands November 4, 1952

2 Claims. (Cl. 313—92)

The invention relates to a cathode-ray tube having a cone which is closed by means of a glass window at its wide end and contains a generally flat glass plate situated near the window, the invention relating particularly to the attachment of this plate.

It is often necessary to provide a cathode-ray tube with a glass plate which is fitted within the cone and on which are provided, for example, a number of electrodes, colour lines, mosaic figures or the like. Such a glass plate was in many cases cemented to the wall of the cone. In particular cases it is necessary for the electrodes secured to the glass plate and for color lines or dots; i. e., a fluorescent screen, provided on it to be accurately positioned relatively to the electrodes of the tube. In this event it is practically very difficult to provide such a glass plate properly within the cone by cementing it thereto. A further difficulty is experienced in that such a glass plate of comparatively large size easily cracks when being in contact with metal which is heated to a high temperature on sealing the window or for other reasons.

An excellent solution of securing such a glass plate in a cathode-ray tube is to hold, in accordance with the invention, the glass plate in such a cathode-ray tube by means of insulating supporting members which, in turn, are secured to a metal supporting frame. As a matter of fact, the use of insulating members between the metal frame and the glass plate is necessary in order to prevent the temperature from rising too rapidly where the glass plate contacts with the metal frame. In this event, the uneven and rapid heating of the metal frame on sealing the glass to the cone and, as the case may be, on degassing the tube is only gradually transferred to the glass plate via the insulating members which are poor heat conductors. If, moreover, the plate is required to be maintained centred in one or more directions, it is preferably rested in slots of the insulating members so as to center and maintain the glass plate without clearance in the cold state. In this event, the metal frame should have a coefficient of expansion higher than that of the glass plate.

The use of such a metal supporting frame has the additional advantage that the centering of the glass plate is not adversely effected by heating. Since the glass plate rests in slots of the insulating members and the metal supporting frame expands more than the glass plate on heating, this plate will come to rest loosely in the slots when sealing the window or degassing the tube, because the spacing between the insulating supports increases more than the size of the glass plate. After cooling, the insulating supports resume their initial position due to shrinkage of the metal frame, with the result that the glass plate is again centered in its initial position. Since this glass plate is supported in slots it cannot drop out when released in the case of high temperature. The metal plate itself may be secured in the cone in a suitable manner. In the case of a metal cone, this may, for example, be effected by sealing metal stay rods to the inner wall of the cone and by securing the stay rods to the supporting frame, for example, by screwing.

Figure 3:
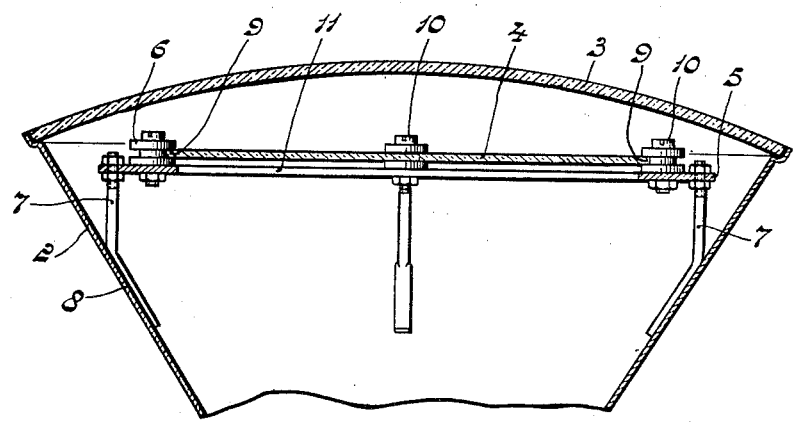

In order that the invention may be readily carried into effect it will now be described in detail with reference to the accompanying drawing, given by way of example, in which Fig. 1 shows a cathode-ray tube, and
Figs. 2 and 3 show details of fastening a glass plate according to the invention.

In the drawing, the reference numeral 1 denotes a cathode-ray tube comprising, in the case under review, a metal cone 2 and a glass window 3 which may, for example, be sealed to the cone 2, if desired by means of glaze. A glass plate 4, which is flat in the case under review, is introduced into the cone prior to sealing the window 3 and accurately centred in one or both directions. The plate 4 is secured to a metal frame 5 by means of insulating members 6 and held without clearance in slots 9 of said insulating members 6 in the cold state. The members 6 may, for example, be secured to the frame 5 by means of screw bolts 10. In this instance, the frame 5 is secured to the cone by means of stay rods 7 and 8. The frame 5 has a rectangular opening 11 to enable the electrons to reach the glass plate 4. On sealing the window 3 to the cone 2, the metal frame 5 is generally also heated at the edges and this much more rapidly than the glass plate 4. It has turned out that direct contact between the glass plate 4 and the frame 5 nearly always results in cracking of the plate 4. This is avoided by attaching the glass plate 4 with the interposition of the insulating supporting members 6. These members are preferably provided with slots. On being heated, the metal frame 5 will more expand than the glass plate 4, so that the latter will engage the slots 9 loosely but cannot drop out of them. After cooling, the insulators 6 resume their initial position to the effect of bringing the glass plate 4 back into its initial position relative to the other electrodes and maintaining it therein. Since, upon heating, the glass plate is released the risk of cracking, notably in the case of flat glass plates, is greatly diminished. The insulators 6 preferably consist of a ceramic material which is easy to machine after sintering, thus permitting a slot having the desired depth and height to be turned or ground in them. If desired, said insulators may be made up of several parts, for example, two discs between which a distance piece is clamped, this piece corresponding to the thickness of the glass plate.

Although only one embodiment has been described, it will be evident that the invention also applies to other constructions liable to cracking due to the heating of glass plates secured to a metal plate and, as the case may be, accurately centred. As an alternative, the glass plate may be curved and alternatively be held so as to be displaceable in a single direction.

What is claimed is:

1. A cathode-ray tube comprising an envelope including a glass window at one end, a glass plate having a given coefficient of expansion disposed within the envelope near the glass window and supporting an electron-receiving member, and means for supporting and centering said glass plate within said envelope, said supporting means comprising a metal supporting frame mounted on said envelope and having a higher coefficient of expansion than that of said glass plate, and a plurality of slotted insulating support members secured to said metal frame and holding and surrounding said glass plate, said glass plate being disposed within the slots of said insulating members without clearance at ambient temperature and being free of contact with said metal frame.

2. A cathode-ray tube as claimed in claim 1 wherein the glass plate is flat, and the electron-receiving member is a fluorescent screen.

References Cited in the file of this patent

UNITED STATES PATENTS

| | | |
|---|---|---|
| 2,425,980 | Baird | Aug. 19, 1947 |
| 2,611,100 | Faulkner et al. | Sept. 16, 1952 |
| 2,663,821 | Law | Dec. 22, 1953 |